Figure 1:
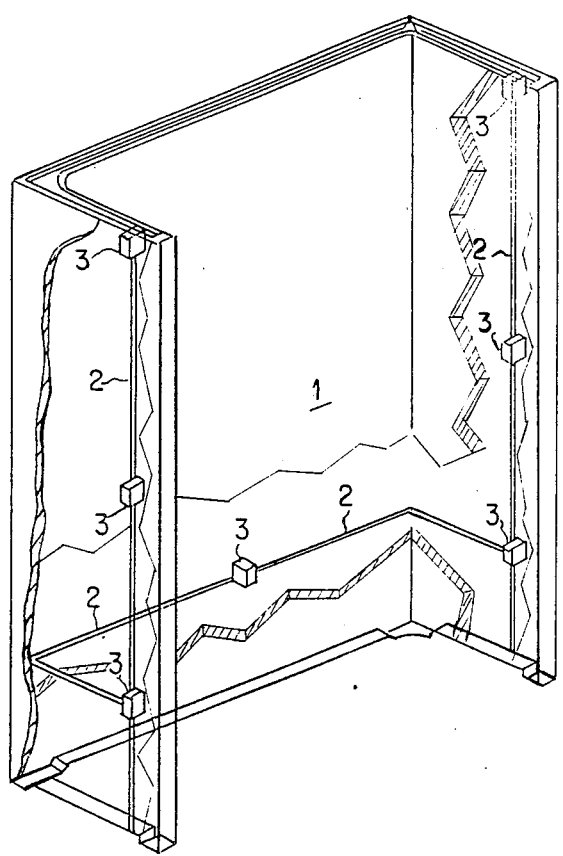

United States Patent [19]

Teron

[11] Patent Number: 4,674,646
[45] Date of Patent: Jun. 23, 1987

[54] ELECTRICAL BOX

[75] Inventor: Christopher Teron, Ottawa, Canada

[73] Assignee: Teron International Urban Development Corporation Ltd., Ottawa, Canada

[21] Appl. No.: 803,324

[22] Filed: Dec. 2, 1985

[30] Foreign Application Priority Data

Jun. 20, 1985 [CA] Canada ................................. 484693

[51] Int. Cl.$^4$ .............................................. H02G 3/11
[52] U.S. Cl. ...................................... 220/3.4; 220/3.6
[58] Field of Search .................. 220/3.4, 3.3, 3.6, 3.9; 52/221

[56] References Cited

U.S. PATENT DOCUMENTS

| | | | |
|---|---|---|---|
| 2,633,263 | 3/1953 | Stonaker | 220/3.4 |
| 2,775,812 | 1/1957 | Mohr | 220/3.4 X |
| 2,808,172 | 10/1957 | Buckels | 220/3.4 |
| 2,815,144 | 12/1957 | Kullander | 220/3.4 |
| 2,898,688 | 8/1959 | Cottar | 220/3.4 X |
| 3,023,920 | 3/1962 | Cook et al. | 220/3.6 |
| 3,601,276 | 8/1971 | Culpepper | 220/3.4 |

Primary Examiner—Steven M. Pollard
Attorney, Agent, or Firm—Sandler & Greenblum

[57] ABSTRACT

An electrical box comprising a housing for protecting electrical connections within a cast wall, having at least one open end, and studs being equal in length fixed to the housing projecting outwardly orthogonally to the plane of the open end sufficiently long to space the open end of the box a predetermined distance from an external wall surface.

2 Claims, 2 Drawing Figures

ELECTRICAL BOX

This invention relates to an electrical box, and particularly to one which can be cast and encased within a concrete wall.

Electrical boxes are used to protect electrical terminations and to support electrical control elements such as switches, dimmer controls, etc. Such boxes are routinely attached to studs in framed walls; a wall surface material such as plasterboard fixed to the studs typically has holes cut adjacent open ends of the electrical boxes to accommodate the switches, face plates, etc.

Certain types of buildings are formed using concrete walls. Conduits pass through the concrete, terminating at steel electrical boxes which are cast into the walls. An open end of each box is located at the surface of the wall, thus forming a cavity in which wires can be terminated, an electrical control mounted, and over which a plate can be fastened.

Concrete walls can be formed as a building is constructed, or can be prefabricated. In both cases the box must be placed into position while the concrete is wet. The box is lowered into the wet concrete, or is placed upon a partially poured wall, and the remaining concrete is poured over the box, between the walls of a form. Unless the box is precisely the same width as the wall, i.e. the distance between the walls of the form, it has been found virtually impossible to maintain the box in a position in which the opening of the box is precisely flush with the wall without fastening the box to the framework, because the box usually turns to some degree. This results in the electrical control being mounted in a plane at an angle to the finished wall, and thus the appearance of poor quality construction and sometimes a poorly operating control.

To ensure that the face of the box is flush with the surface, one is used which extends across the entire thickness of the wall. In the case in which one side of the box is closed, it will be found that there will be virtually no concrete covering it. If some concrete does cover the side, this concrete has no aggregate and soon falls off. This results in the backside of the electrical box showing, which is unsightly.

In the case in which both sides of the box are open, both sides of the wall will have openings into the box. While the location of the box will have been predetermined to provide a control location for one room, this is very unlikely to be a good location for the room on the other side of the wall. Thus the opening on that side of the room must be capped. The cap forms a discontinuity in the wall, thus decreasing its quality.

The present invention is an electrical box for use in solid walls such as concrete which automatically locates itself with its openings parallel to the wall surface, thus allowing controls which are mounted therein to be precisely parallel or orthogonal to the wall surface. A thin wall portion of controlled thickness is maintained over the box opening or openings. This maintains the same wall material over the box as the remainder of the wall, in the event that the box is not used. Thus for a 2-ended box, in which the same box could be used to mount electrical controls on both sides of a wall, either or both sides of the box can be used, and if not used, there is no disturbance to the wall surface. In addition, a control mounted in the box is maintained square or parallel to the wall surface.

The invention is achieved by a box comprising a housing for protecting live electrical wires, having at least one open end, and having studs being equal in length fixed to the housing projecting outwardly orthogonally to the plane of the open end sufficiently long to space the open end of the box a predetermined distance from an external wall surface. Preferably the box has oppositely located open ends, with equal numbers of the studs being symmetrically spaced on opposite sides of both openings. In use, the box is enveloped in a mass of concrete forming a wall thickness equal to the distance between the ends of the oppositely located studs, the box being located with its studs extending to the external opposite wall surfaces. Thus thin front walls are located in front of the open ends having thickness at the studs the same as the lengths of the studs in front of the open ends.

Since the distance between the opposite ends of the studs is the same as the wall thickness, it spans the distance between the forms used while fabricating the wall, and thus the box is kept exactly in the correct alignment, since it cannot turn. Further, since thin front walls block the openings of the box with the same material as the main wall, there is substantially no discontinuity of the material over the wall surface and over the box. The thin wall material can be easily knocked out over the end of the box where a control is to be mounted.

As a great advantage now, since the box can be embedded in the wall, and not used or seen, prefabricated walls can be made having standard layouts of embedded boxes. The thin concrete wall in front of the box opening can be knocked out where desired for the particular room design, and the remainder left intact. Economy of manufacture using a standard wall formation is thus achieved, with an accompying reduction in cost and uniformity of manufacture, quality of wall surface, and ease of access.

It should be noted that in wiring to conventional electrical boxes, a ground connection point, usually provided by a screw threaded into the box is located at the rear of the box. In the present box, the electrical control is fastened as usual to a pair of conductive supports extending in the plane of the opening across the top and bottom of the open end of the box. However as both sides of the box are preferably open, to provide a ground wire fixing point, at least one support is indented inwardly of the box adjacent a side of the box. A ground screw is threaded into the indented part of the box for connecting the ground wire to the support and thus to the box. Thus the electrican who installs the control need merely fix the ground wire to a screw right adjacent the opening of the box, but below the surface of the position in which the control is to be supported. Otherwise the ground wire connection screw would have to be screwed to the side of the box, which would be very difficult to use.

Figure 2:
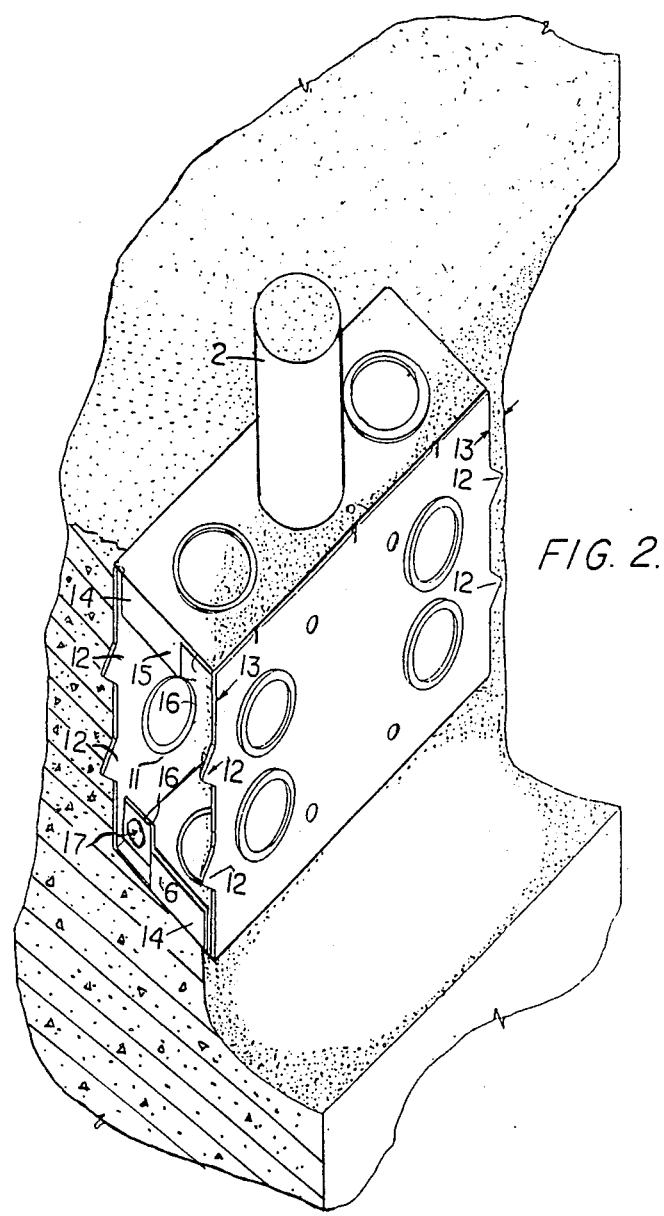

A better understanding of the invention will be obtained by reference to the detailed description below, with reference to the following drawings, in which:

FIG. 1 is a perspective view of a prefabricated concrete wall with many boxes interconnected by conduit, and FIG. 2 is a perspective view of a box according to the present invention embedded in a portion of concrete which is part of a section of a concrete wall.

Turning first to FIG. 1, a prefabricated concrete wall 1 is shown, which, for the purpose of example, is U- shaped in horizontal cross-section. Such a wall of precast concrete can be used to divide rooms or portions of rooms while supporting a roof or upper story floor. Such walls are often used without any exterior wall cladding; the concrete wall finish forms the wall surface, although it can be painted or covered by a thin veneer if desired.

It is desired to run an electrical cables within the wall, and this is normally done via conduits 2, which are typically formed of steel pipe. The conduits terminate in steel electrical boxes 3.

As an advantage of the use of the present invention, the boxes and conduits can be formed in a standard layout, and inserted between the walls of the forms used to shape the final cast concrete wall, such as is shown in FIG. 1.

Previously, when locating the boxes, in order to provide a smooth wall surface over the boxes where not used, the width of the boxes were made narrower than the thickness of the walls. However it was very difficult to locate the boxes evenly spaced between the wall surfaces, i.e. the walls of the forms, and very often the boxes would turn, causing their faces to be at an angle other than square or in a plane parallel to the wall surface. As explained earlier, once an electrical control such as a light switch was fastened to the box, it would be at an angle to the face of the wall, resulting in an installation of poor quality. The wall thickness over the box was uneven and subject to breakage.

FIG. 2 illustrates a cross-section of a portion of a wall in which a box according to the present invention is embedded. The box is formed of a housing 10 having at least one open end 11. Studs 12 being equal in length are fixed to the housing and project outwardly orthogonally to the plane of the open end, and are sufficiently long to space the open end of the box a predetermined distance from an external wall surface 18. The predetermined distance 13, being the length of the studs, defines the thickness of the thin wall portion which remains part of the concrete wall, blocking the opening to the housing. This thin wall portion can be knocked out if an electrical control is to be mounted in the box, thus giving access to the interior of the box at that location. However those thin wall portions which are not knocked out, simply cover the box and remain as a continuum as part of the wall.

When the electrical box is being placed between the walls of the form in which the concrete is poured, the studs contact the inner walls of the form, spacing the edges of the box around the open ends, i.e. at the studs, equidistant from the form walls. This results in correct alignment of the box within the resulting wall. For this to occur, the distance between the ends of the studs on opposite ends of the box should be virtually the same as the thickness of the wall to be cast.

It is preferred that equal numbers of studs should be symmetrically spaced on opposite sides of both openings. It is also preferred that the studs should be coextensive with the sides of the box, i.e. merely be extensions of them. However the studs could be extensions welded or otherwise fixed to the sides of the box.

It is preferred that the studs should be tooth-shaped, as shown in FIG. 2. However they can be finger-shaped or can be in other shapes if desired. However their places of contact to the forms should have minimum area, so that they would not be significantly visible at the surfaces of the finished walls.

Once it is desired to wire the building, the location of each box to be wired is determined, either by preknowledge of its location on a plan, or it is found by use of a metal detector. The thin wall portion in front of the opening can then be punched in by means of a chisel and hammer, and the knocked-out portion can be removed. Access to the interior of the box is thereby obtained.

During positioning of the box between the forms is which the concrete is to be poured, plastic or cardboard buffers can be used at the openings of the boxes, supported by crumpled newspaper within the boxes. This will protect the interior of the box from being contaminated with concrete.

A pair of conductive supports 14 extend in the plane of the opening across the top and bottom of the open end of the box. Preferably the supports are merely extensions of the adjacent sides of the box, and are bent into the plane of the opening. Tapped holes 15 are located in the supports, into which a standard electrical control such as a switch can be screwed.

At least one, but preferably both of the supports are indented inwardly of the box at a non-interferring position spaced from the control support, e.g. adjacent a side of the box. In the indented portions 16 screws 17 are screwed, in order to connect one or more ground wires. Both sides of the box can be of identical form.

While wall material of concrete has been described, the box is not restricted for use with concrete. The box can be used embedded within, or used with other materials such as glass, plastic, etc., while retaining the advantages of the invention. In addition, the use of the box is not restricted to walls; the boxes can be used in ceilings, floors, etc., or wherever the advantages of the invention can usefully be employed.

A person understanding this invention may now conceive of other embodiments or variations using the principles of the invention described herein. All are considered to be within the sphere and scope of the invention as defined in the claims appended hereto.

I claim:

1. An electrical box comprising a housing for protecting electrical connections within a slab wall, having two oppositely located open ends, equal length studs formed of tooth shaped extensions of the box projecting outwardly orthogonally to the plane of the open ends from opposite sides of the box, the box being located between the outer surfaces of a wall, the studs being of such length from the open ends of the box as to define the positions of the planes of the open ends of the box from said outer surfaces of the wall, the box being enveloped in a mass of concrete forming said slab having thickness equal to the distance between the ends of the studs projecting from the opposite sides of the box, the box being located with the studs extending to the outer surfaces of the wall and no further whereby thin front concrete walls are formed as part of said slab directly in front of said open ends having thickness at said studs about the same as the length of the studs in front of said open ends.

2. An electrical box comprising a housing for protecting electrical connections within a slab wall, having two oppositely located open ends, equal length studs formed of tooth shaped extensions of the box projecting outwardly orthogonally to the plane of the open ends from opposite sides of the box, the box being located between a pair of forms, and having the ends of the studs in contact with the inside walls of the forms, the studs being of such length from the open ends of the box as to define the positions of the planes of the open ends of the box from the inside walls of the forms, the box being enveloped in a mass of concrete between the forms forming said slab having thickness equal to the distance between the inside walls of the forms and thus the distance between the ends of the studs projecting from the opposite sides of the box, the box being located with its studs extending to the internal wall surfaces of the forms and no further whereby thin front concrete walls are formed as part of said slab directly in front of said open ends having thicknes at said studs about the same as the length of the studs in front of said open ends.

* * * * *